(12) United States Patent
Duff

(10) Patent No.: US 8,106,906 B1
(45) Date of Patent: Jan. 31, 2012

(54) OPTICAL SYSTEM EFFECTS FOR COMPUTER GRAPHICS

(75) Inventor: Thomas Douglas Selkirk Duff, Berkeley, CA (US)

(73) Assignee: Pixar, Emeryville, CA (US)

(*) Notice: Subject to any disclaimer, the term of this patent is extended or adjusted under 35 U.S.C. 154(b) by 904 days.

(21) Appl. No.: 12/123,043

(22) Filed: May 19, 2008

Related U.S. Application Data

(60) Provisional application No. 60/940,380, filed on May 25, 2007.

(51) Int. Cl.
*G06T 15/10* (2011.01)
(52) U.S. Cl. .................................. 345/427; 345/419
(58) Field of Classification Search .......... 345/427, 345/419
See application file for complete search history.

(56) References Cited

U.S. PATENT DOCUMENTS

| | | | |
|---|---|---|---|
| 6,917,718 B2* | 7/2005 | Ichimura | 382/264 |
| 2007/0253637 A1* | 11/2007 | Adam | 382/274 |
| 2007/0273690 A1* | 11/2007 | Keller | 345/426 |

OTHER PUBLICATIONS

Haeberli et al. "The Accumulation Buffer: Hardware Support for High-Quality Rendering" Computer Graphics, vol. 24, No. 4, Aug. 1990; pp. 314-315.*

* cited by examiner

*Primary Examiner* — Xiao M. Wu
*Assistant Examiner* — Maurice L McDowell, Jr.
(74) *Attorney, Agent, or Firm* — Law Office of Jonathan Hollander PC

(57) ABSTRACT

Users define the aperture shape and brightness characteristics of a virtual lens system to generate optical system effects in computer graphics images. An image sample point is associated with a aperture point within the aperture. The location of the aperture point may be based on the shape of the aperture. The image sample point value may be scaled based on a brightness value of an associated aperture point. Alternatively, the aperture point location may be based on brightness characteristics of the aperture. An optical system transmission function based on the brightness characteristics of the aperture specifies the density distribution of aperture positions within the aperture. The aperture points locations are distributed according to this optical system transmission function so that the out of focus regions or bokeh of images mimic the shape and brightness characteristics of the aperture. The aperture points, image sample points, and three-dimensional scene data are provided to a renderer to create images including optical system effects.

17 Claims, 8 Drawing Sheets

OPTICAL SYSTEM EFFECTS FOR COMPUTER GRAPHICS

CROSS-REFERENCE TO RELATED APPLICATIONS

This application claims priority to U.S. Provisional Patent Application No. 60/940,380, filed May 25, 2007, which is incorporated by reference herein for all purposes.

BACKGROUND OF THE INVENTION

The present invention relates to the field of computer graphics, and in particular to methods and apparatus for creating, modifying, and using components to create computer graphics productions. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

In conventional photography and cinematography, artists often use the physical limitations of conventional optical and photographic equipment to achieve aesthetic effects. For example, depth of field is a visual effect in which some portions of an image are in focus and other portions of the image are out of focus. Depth of field is the result of the aperture size of a camera and the focal length of its optical system. Typical cameras can only focus on objects within a range of distances, referred to as the depth of field. For out of focus portions of an image, typical optical systems blur each point of light into a roughly circular area on the image plane, referred to as a circle of confusion. Objects that are within the camera's depth of field appear in focus, while objects in front of or behind the depth of field appear out of focus.

Although a camera with an infinite depth of field, in which everything in an image is in focus regardless of its distance from the camera, may be ideal from a technical perspective, artists often use the depth of field of conventional cameras to emphasize or deemphasize objects in a scene. Also, the out of focus objects in a scene may be aesthetically pleasing, enhancing the artistic impact of images.

In addition to normal depth of field effects, which result even from ideal optical systems having finite size apertures, there are other optical system effects in real-world optical systems that have an aesthetic impact on images. For example, photographers use the Japanese term "bokeh" to describe the aesthetic qualities of the unfocused portions of an image. Lenses and other camera optical systems with identical focal lengths and other characteristics may have different bokeh. For some optical systems, the circle of confusion produced by an out of focus point is brighter at its center than its edges. Photographers often consider this effect to be aesthetically pleasing and refer to these types of optical systems as having good bokeh. Conversely, other types of optical systems produce a circle of confusion with a dark center and bright edges, which some photographers consider to be aesthetically displeasing.

Additionally, the bokeh of optical systems is affected by the shape of the optical system aperture. Typical optical systems include an aperture for controlling the amount of light that reaches the image plane of a camera. A circular aperture will produce a circular-shaped circle of confusion for unfocused points in an image. Many optical systems use mechanical iris to form polygonal shaped apertures. For example, a mechanical iris with six blades will typically form a hexagonal shaped aperture. The blades of a mechanical iris may be bowed inwards or outwards to further approximate a circular aperture. A polygonal shaped aperture will form a similarly shaped circle of confusion for unfocused points in an image.

Because audiences have become accustomed to viewing images created using real-world cameras and optics, computer graphics artists have sought to emulate optical system effects such as depth of field and bokeh to provide their images and animations with additional verisimilitude.

One prior approach places a virtual optical system and/or virtual camera aperture in front of each image sample, such as a pixel or sub-pixel sample. Each image sample is assigned to a different portion of the aperture. Rendering algorithms such as ray tracing can be used to trace the path of light through the aperture and optical system into the scene, thereby simulating depth of field effects. Because this approach requires light rays to be traced from the image samples, through different portions of the aperture, and into the scene, it can only be used with ray tracing and other similar rendering algorithms modeling light transport. Ray tracing in rendering consumes large amounts of computational time and resources, which makes it unsuitable for many real-time applications as well as non-real-time applications where computational time and resources are limited.

It is therefore desirable for a system and method to provide improved optical system effects for computer generated images and animations. It is desirable for the system and method to be suitable for use with a wide variety of rendering algorithms. It is further desirable for the system and method to provide artists with greater aesthetic control over optical system effects than what is possible with typical real-world optical systems.

BRIEF SUMMARY OF THE INVENTION

An embodiment of the invention generates optical system effects in computer graphics systems due to the aperture shape and transmission characteristics of virtual optical systems. In an embodiment, users define the shape and transmission characteristics of the virtual optical system. An image sample point is associated with a aperture point within a virtual optical system aperture. The location of the aperture point is based at least in part on the shape of the optical system aperture. In an embodiment, the sample value of an image sample point is scaled based on a transmission value of an associated aperture point. In another embodiment, the location of the aperture point is based at least in part on transmission characteristics of the aperture. In a further embodiment, a probability density function based on the transmission characteristics of the virtual aperture specifies the probability of light passing through a location within the aperture. The locations of aperture points are distributed according to this probability density function so that each aperture point location has an approximately equal probability of receiving light. The aperture points, image sample point, and three-dimensional scene data are provided to a renderer to create rendered images including the optical system effects.

In an embodiment, a method of creating a optical effect in a computer graphics image includes receiving scene data defining a three-dimensional scene and receiving optical system data defining a virtual optical system including an optical system transmission function. The optical system transmission function specifies the aperture shape, light transmission characteristics, and optionally other attributes that potentially affect the appearance of circles of confusion produced by the virtual optical system. The method selects image sample points for sampling the scene data. Each image sample point is associated with an aperture point. Each of the aperture points has a location within the aperture. The distribution of locations of the aperture points is based on the optical system transmission function. The scene data, the image sample points, and the aperture points are provided to a renderer, which is adapted to determine image sample point values for the image sample points from the scene data and the aperture points.

In a further embodiment, the distribution of the locations of the aperture points is consistent with a probability density function specifying probabilities of receiving light at the locations of the aperture points. The probability density function is defined by the optical system transmission function. In some applications, the locations of the aperture points have equal probabilities of receiving light according to the probability density function. In an embodiment, each aperture point is associated with a portion of the probability density function, wherein the portions of the probability density function have equal probabilities. In still a further embodiment, the portions of the probability density function correspond with regions of the aperture, wherein the location of each aperture point is within one of the regions. The locations of the aperture points within the regions may be randomly or pseudo-randomly selected.

BRIEF DESCRIPTION OF THE DRAWINGS

The invention will be described with reference to the drawings, in which.

DETAILED DESCRIPTION OF THE INVENTION

Figure 1A:
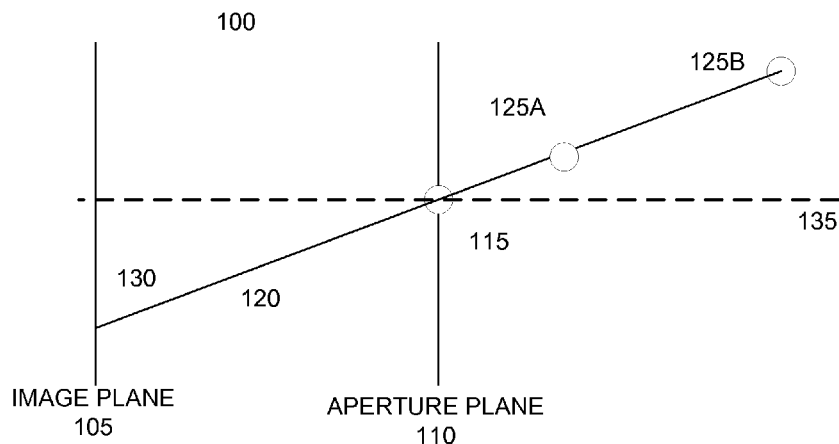
FIGS. 1A and 1B illustrate the cause of depth of field effects in real-world optical systems.
Figure 1B:
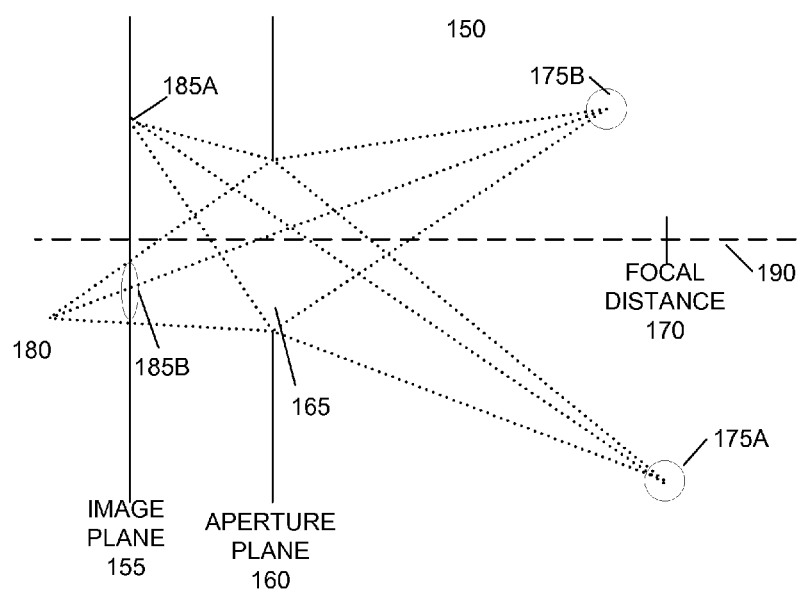

FIGS. 1A and 1B illustrate the cause of depth of field effects in real-world optical systems. FIG. 1A illustrates an example optical system 100 including an image plane 105 for receiving light that forms an image and an aperture plane 110 to admit light from a scene onto the image plane 105. Aperture plane 110 include an aperture or opening 115 to admit light from the scene. In example system 100, aperture 115 is a pinhole aperture, which ideally is infinitesimally small. System 100 has an infinite depth of field. The light from any object, regardless of its distance from the aperture plane 110, will pass through a single point, the pinhole aperture 115, and be focused perfectly on the image plane 100. For example, light from objects 125a and 125b are both focused to a single point 130 on image plane. An optical axis 135 is perpendicular to the image plane 105 and passes through the aperture 115.

In contrast, FIG. 1B illustrates an optical system 150 with a finite depth of field. System 150 includes an image plane 155 and an aperture plane 160. Aperture plane 160 includes an aperture 165 to admit light on to the image plane 155. Aperture 165 is relatively large compared to the pinhole aperture 115 of system 100. Although omitted for clarity from FIG. 1B, system 150 also may include lenses, mirrors, or other optical elements to focus light onto the image plane 155. An optical axis 190 is perpendicular to the image plane 155 and passes through the center of the aperture 165.

In system 150, light from any point in the scene may pass through different points of the aperture 165. For objects at or near focal distance 170, such as object 175A, light will be focused on to a single point of the image plane 155 (or a small, relatively imperceptible circle). For example, light from object 175A passes through many points of aperture 165 and is focused to point 185A on image plane 155.

Light from objects further away from focal distance 170 (either in front of or behind the focal distance 170) will be focused to points ahead or behind to the image plane 155. As a result, the light hitting the image plane 155 will form a circle or other shape, rather than a point. This out of focus light on the image plane 115, referred to as a circle of confusion (regardless of its actual shape), appears as a blur in the image. For example, the light from object 175B passes through many points of the aperture 165 and is focused on point 180, which is behind image plane 165. The light from object 175B forms the circle of confusion 185B on the image plane 155. Thus, object 175B appears blurred or out of focus in the image. Typically, the size of the circle of confusion or the amount of blurring increases as the size of the aperture increases relative to the focal distance 175. Thus, increasing the aperture size decreases the depth of field, or range of distances in which objects are perceived to be in focus.

A renderer typically produces one or more computer generated images from scene data by sampling optical attributes of the scene data at a number of different image sample points located on a virtual image plane. Image sample points can correspond with pixels in the rendered image or with sub-pixel samples that are combined by the renderer to form pixels in the rendered image. Image samples such as pixels and sub-pixel samples may be distributed in regular locations on the image plane or at random or pseudo-random locations on the image plane to reduce aliasing and other sampling artifacts.

Depth of field and optical system effects occur because light from an object can travel through many different points of an aperture before reaching the image plane. An embodiment of the invention creates depth of field and optical system effects in computer graphics images by assigning different virtual lens or virtual aperture positions to image sample points. By associating each image sample with a different portion of the aperture and evaluating a large number of image samples, depth of field and optical system effects can be simulated.

Figure 2A:
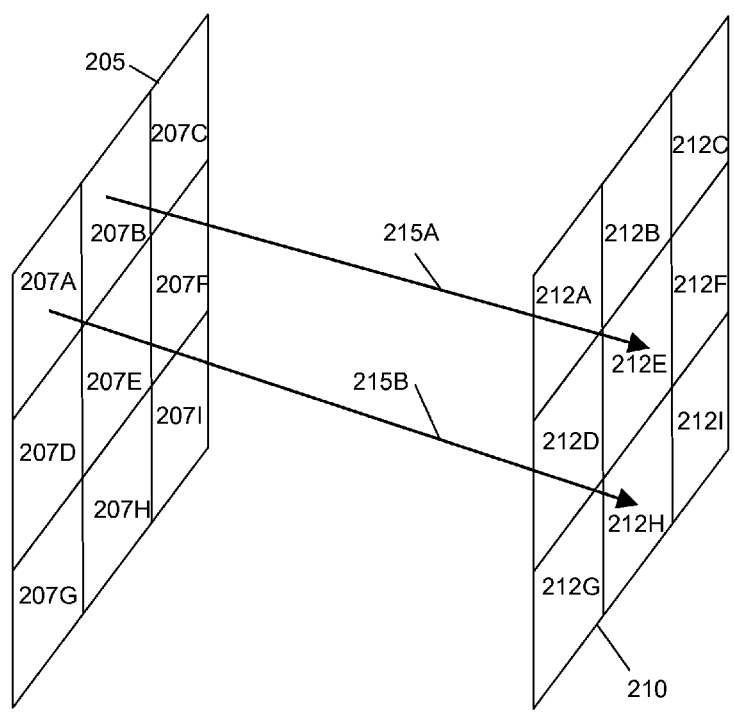
FIGS. 2A-2C illustrate the distribution of image samples for depth of field and optical system effects according to an embodiment of the invention.
Figure 2B:
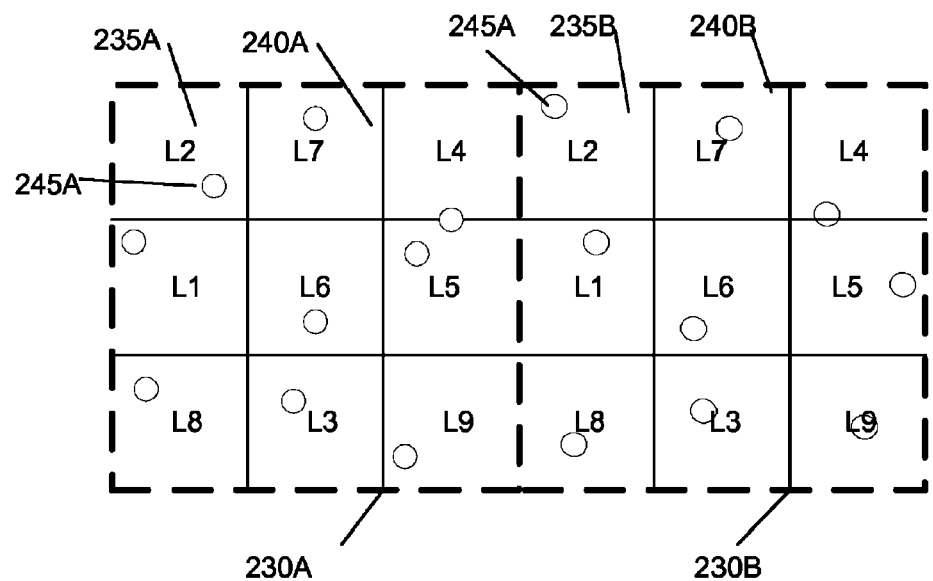
Figure 2C:
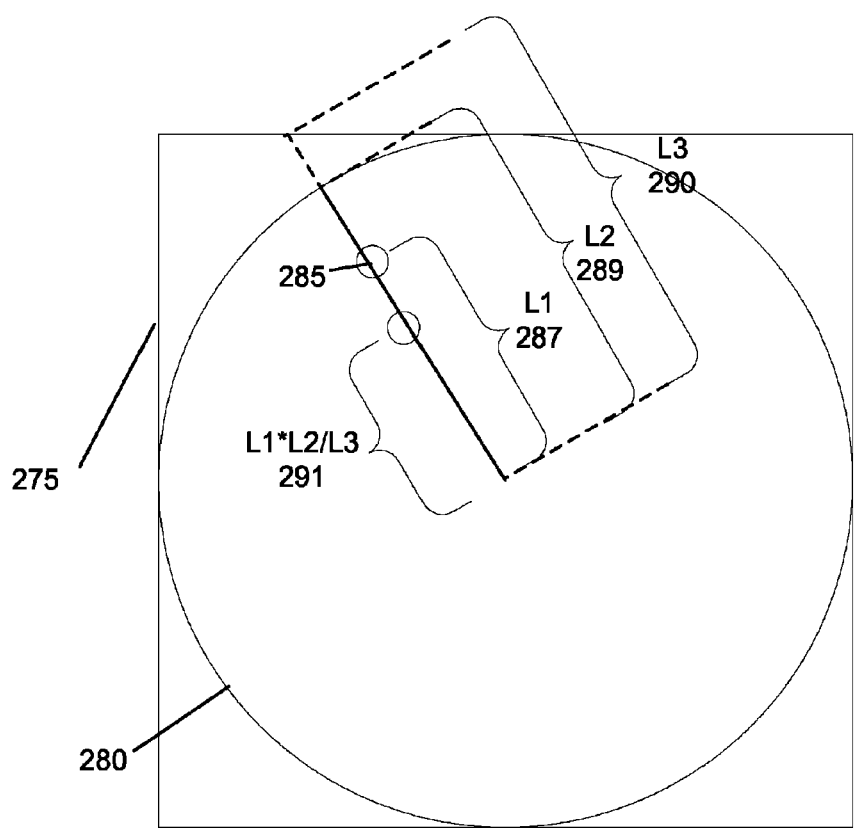

FIGS. 2A-2C illustrate the distribution of image samples for depth of field and optical system effects according to an embodiment of the invention. In an embodiment, image samples in the image plane can be distributed in a random or pseudo-random manner to prevent unwanted visual artifacts and aliasing. FIG. 2A illustrates a stratified assignment of aperture positions to image samples. In an embodiment, a region of the image plane 205, which may correspond with the region of a pixel, is subdivided into a number of sub-regions 207A-207I. Each sub-region 207 includes one image sample. Within a sub-region 207, the image sample is assigned a random, pseudo-random, or other arbitrary or irregular location. For different pixels, image samples may be assigned different locations within corresponding sub-regions. By stratifying image samples into sub-regions, the variance of the distribution of image samples in region 205 decreases. This reduces the amount of visual noise in images.

Similarly, a region of an aperture plane 210 is subdivided into a number of sub-regions 212A-512I. Each sub-region 212 of the aperture plane includes one or more aperture positions. Within an aperture sub-region 212, aperture positions are assigned a random, pseudo-random, or other arbitrary or irregular location. By stratifying aperture positions into sub-regions, the variance of the distribution of aperture positions in region 212 decreases. This reduces the amount of visual noise in images.

Each sub-region 207 of the image plane is associated with one of the sub-regions of the aperture plane. For example, sub-region 207A is associated with aperture plane sub-region 212H, as indicated by ray 215B. Similarly, sub-region 207B is associated with the aperture plane sub-region 212E, as indicated by ray 215A. The number of sub-regions 212 of the aperture plane may be the same or different from the number of sub-regions 207 of the image plane. Thus, there may be zero, one, or more image samples associated with each aperture plane sub-region 212.

In an embodiment, there may be a correlation between sub-regions of each pixel on the image plane and the assigned aperture plane sub-region. FIG. 2B illustrates an example of this correlation. FIG. 2B illustrates two adjacent pixels, 230A and 230B. Each pixel includes a number of sub-regions, such as sub-regions 235A and 240A in pixel 230A and sub-regions 235B and 240B in pixel 230B. Each sub-region is associated with a sub-region of the aperture plane. In this example, corresponding sub-regions of pixels are associated with the same region of the aperture plane. For example, both sub-regions 235A and 235B are associated with the same aperture plane sub-region, referred to here as L2. Similarly, both sub-regions 240A and 240B are associated with the same aperture plane sub-region, referred to here as L7.

Although corresponding sub-regions of pixels are associated with the same aperture plane sub-region, in an embodiment, image samples are assigned different aperture positions within the sub-region. For example, the image sample associated with sub-region 235A is assigned to aperture position 245A, located in the bottom right corner of the aperture plane sub-region L2. In contrast, the image sample associated with sub-region 235B is assigned aperture position 245B, which is located in the upper left corner of the aperture plane sub-region L2. By displacing or jittering aperture positions and image sample positions within aperture plane and image plane sub-regions, respectively, aliasing and other unwanted visual artifacts are reduced. Moreover, as discussed above, the stratification of image samples and aperture positions into sub-regions reduces variance-related visual noise.

As shown in FIGS. 2A and 2B, aperture positions are distributed over a square region of the aperture plane. However, real-world optical system apertures are often circular or closely approximate circles using mechanical irises. FIG. 2C illustrates an example transformation of a aperture position in a square aperture to a corresponding aperture position in a circular aperture. A aperture position 285 is defined within a square or rectangular aperture 275. A circular aperture 280 is defined within the square aperture. To map the aperture position 285 to the circular aperture, an embodiment of the invention measures the distance L1 287 from the center of the apertures to the aperture position 285. The distance L2 289 from the center of the apertures to the edge of circular aperture 280, passing through aperture position 285 is also measured. The distance L3 290 from the center of the apertures to the edge of the square aperture 275, passing through aperture position 285 is also measured. In an embodiment, a new aperture position 291 within the circular aperture 280 is defined by scaling the radial distance L1 287 by the ratio of the distances L2 289 and L3 290 to the edges of the apertures 280 and 275. Thus, the aperture position 285 is moved to a new radial distance defined by L1*L2/L3.

FIG. 2C illustrates a transformation suitable for mapping aperture positions in a square aperture to corresponding aperture positions in a circular aperture. However, as discussed above, the bokeh, or aesthetic appearance of out of focus portions of an image, is affected by the shape of the aperture. A polygonal shaped aperture, typically formed by a mechanical iris in real-world optical systems, will form a similarly shaped circle of confusion for unfocused points in an image. For example, if an aperture has a hexagonal shape, the circle of confusion for an out-of-focus spot will also have the hexagonal shape.

An embodiment of the invention uses an optical system transmission function to specify the aperture shape, light transmission characteristics, and/or other attributes that potentially affect the appearance of circles of confusion produced by the virtual optical system. For example, an optical system transmission function may be used to simulate the effect of non-circular apertures for computer graphics images.

Figure 3A:
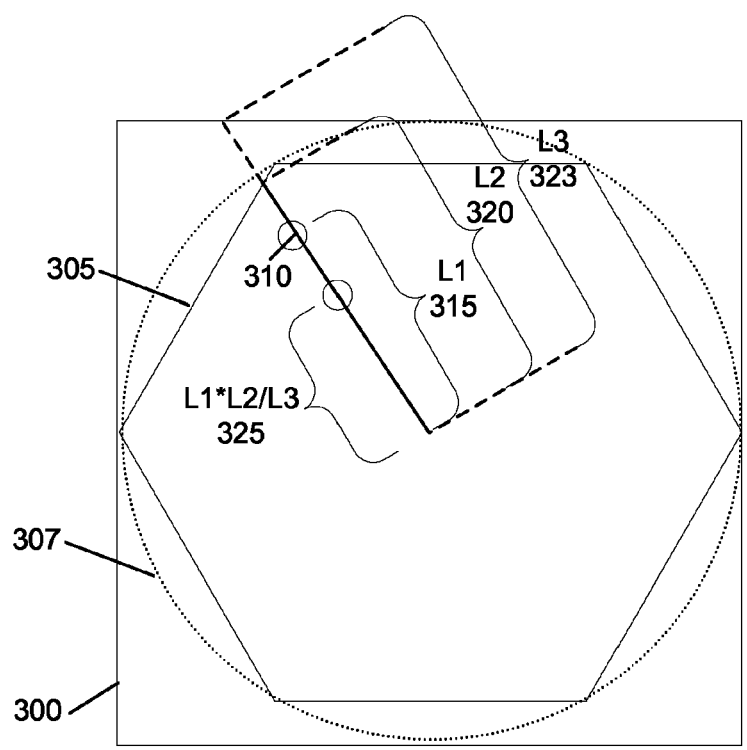
FIGS. 3A and 3B illustrate an aperture shape optical effect according to an embodiment of the invention.
Figure 3B:
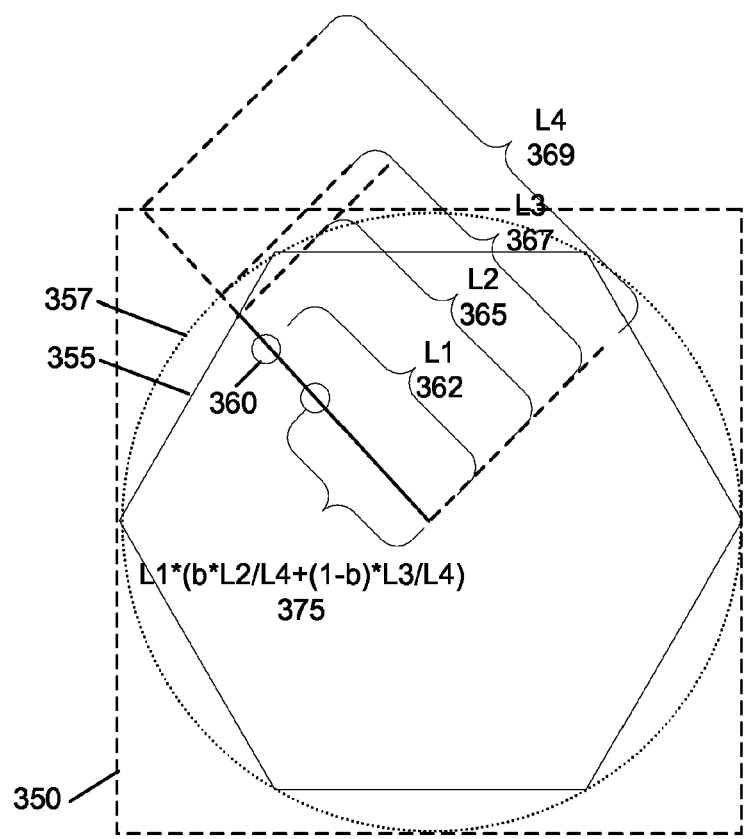

FIGS. 3A and 3B illustrate a non-circular aperture shape optical effect according to an embodiment of the invention. FIG. 3A illustrates an example transformation of a aperture position in a square aperture 300 to a corresponding aperture position in a polygonal aperture 305. A aperture position 310 is defined within a square or rectangular aperture 300. An optical system transmission function defines a polygonal aperture 305 within the square aperture 300. In an embodiment, the polygonal aperture 305 can be defined by any arbitrary polar function providing a radius value for a given angle input. In an embodiment, users can specify the shape of polygonal aperture 305 directly by specifying the number and position of its vertices. Another embodiment assumes that the polygonal aperture 305 is a regular polygon having sides of equal length. In this embodiment, users can specify the number of sides for the polygonal aperture 305 and its angular orientation. In other embodiments, the polygonal aperture 305 can be a polygon with an arbitrary number of sides of arbitrary length. For comparison, a circular aperture 307 similar to that discussed above is also shown in FIG. 3A.

To map the aperture position 310 to the polygonal aperture 305, an embodiment of the invention determines the distance L1 315 from the center of the apertures to the aperture position 310. The distance L2 320 from the center of the apertures to the edge of polygonal aperture 305, passing through aperture position 310 is also determined The distance L3 323 from the center of the apertures to the edge of the square aperture 300, passing through aperture position 310 is also determined. In an embodiment, a new aperture position 325 within the polygonal aperture 305 is defined by scaling the radial distance L1 315 by the ratio of the distance L2 320 to distance L3 323. Thus, the aperture position 310 is moved to a new radial distance 325 defined by L1*L2/L3.

The transformation of FIG. 3A, when combined with a depth of field rendering technique, will result in a polygonal, rather than circular, circle of confusion for out of focus light points. As discussed above, some mechanical iris have curved blades, resulting in a polygonal aperture with bowed edges. FIG. 3B illustrates an example transformation of a aperture position in a square aperture 350 to a bowed polygonal aperture according to an embodiment of the invention.

An aperture position 360 is defined within a square or rectangular aperture 350. An optical system transmission function defines a polygonal aperture 355 within the square aperture 350. In an embodiment, the polygonal aperture 355 can be defined by any arbitrary polar function providing a radius value for a given angle input. In an embodiment, users can specify the shape of polygonal aperture 355 directly by specifying the number and position of its vertices. Another embodiment assumes that the polygonal aperture 355 is a regular polygon having sides of equal length. In this embodiment, users can specify the number of sides for the polygonal aperture 355 and its angular orientation. Additionally, a circular aperture 357 is defined within the square aperture 350.

To map the aperture position 360 to a bowed polygonal aperture, an embodiment of the invention measures the distance L1 362 from the center of the apertures to the aperture position 360. The distance L2 365 from the center of the apertures to the edge of polygonal aperture 355, passing through aperture position 360 is determined. Additionally, the distance L3 367 from the center of the apertures to the edge of circular aperture 357, passing through aperture position 360, is determined. The distance L4 369 from the center of the apertures to the edge of the square aperture 300, passing through aperture position 360 is also determined.

In an embodiment, the radial distance L1 362 between the center of the apertures and aperture position 360 is scaled by a weighted combination of the ratios of L2 365 to L4 369 and L3 367 to L4 369. The optical system transmission function includes a bowing parameter value, b, specifies the relative weights of these ratios. For example, a bowing parameter b may have a value ranging from 1 to −1. The radial distance of the scaled aperture position, 375, may be specified as $L1*(b*(L2/L4)\pm(1-b)*(L3/L4))$. A value of b=0 will yield a circular aperture, while a value of b=1 will yield a polygonal aperture with straight edges. Any value of b between 0 and 1 will yield a polygonal aperture with edges bowed outwards. Similarly, any value of b between 0 and −1 will yield a polygonal aperture with edges bowed inward.

In some implementations, it is desirable to perform these operations in Cartesian, rather than polar coordinates. To facilitate this, polygonal sine and cosine functions can be used. Typically, a sine or cosine function defines the relationship between an angle and the ratio of the sides of a right triangle formed by a point on a unit circle. Similarly, a polygonal sine or cosine function defines the relationship between an angle and the ratio of the sides of a right triangle formed by a point on a unit-sized polygon.

As an alternative to the mapping operations shown in FIGS. 3A and 3B, an alternate embodiment of the invention can select a aperture position within the square aperture, determine if the selected aperture position is inside or outside of the desired polygonal or bowed polygonal aperture, and discards the selected aperture position if the selected aperture position is located outside of the desired polygonal or bowed polygonal aperture.

In addition to having polygonal shaped, rather than circular, blurring, the bokeh of a real-world optical system will often produce circles of confusion with different brightness characteristics, such as circles of confusion that are brighter or darker in the center than at the edges. These brightness characteristics are caused by variations in the amount of light passing through different portions of the aperture due to the light transmission characteristics of lenses, mirrors, and/or other optical elements in real-world optical systems. An embodiment uses an optical system transmission function to simulate this aperture brightness effect for computer generated images.

Figure 4A:
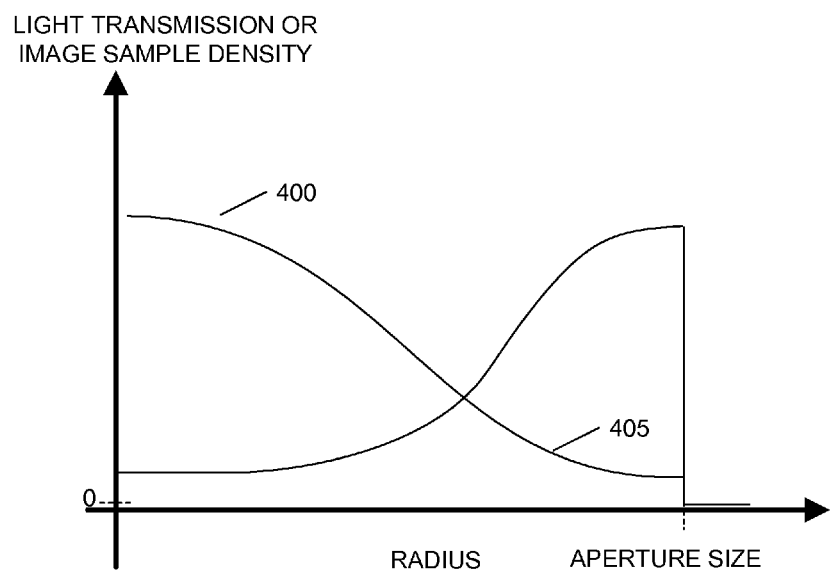
FIGS. 4A and 4B illustrate an optical system transmission effect according to an embodiment of the invention.
Figure 4B:
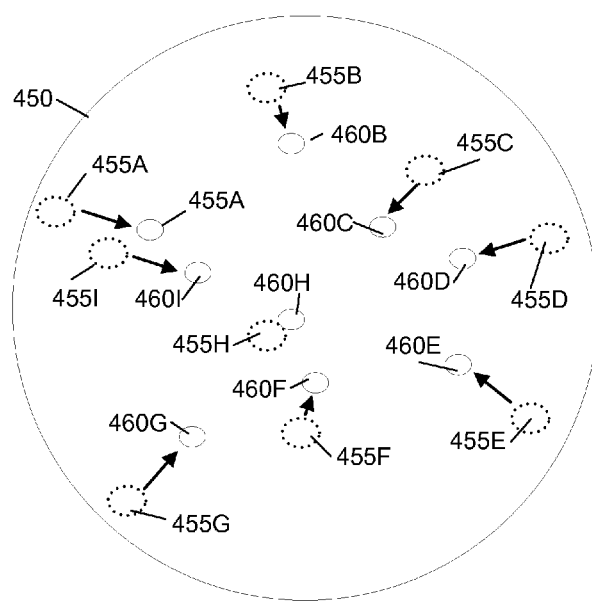

FIGS. 4A and 4B illustrate an aperture brightness optical effect according to an embodiment of the invention. As discussed above, an optical system transmission function defines the aperture shape, light transmission characteristics, and/or other attributes that potentially affect the appearance of circles of confusion produced by the virtual optical system.

FIG. 4A illustrates a first example 400 of light transmission characteristics of an optical system transmission function. In this example, the optical system transmission function expresses light transmission values as a function of radial distance from the center of the aperture. The transmission value is the relative amount of light passing through a aperture position at a given radial distance as compared with other aperture positions within the virtual aperture.

The example light transmission characteristics 400 of the optical system transmission function may be specified by user, either by directly inputting light transmission parameters or by selecting the desired optical system or bokeh characteristics. In an embodiment, the light transmission characteristics of an optical system transmission function may be determined by analyzing the characteristics of a user-specified optical system. In other embodiments, the light transmission characteristics may be any arbitrary function specified by a user and may not correspond with any realistic or physically possible optical system.

In one embodiment, the light transmission characteristics of the optical system transmission function brighten or dim the values of image sample points based on their corresponding aperture positions by scaling the value of an image sample point based on the light transmission characteristics of its associated aperture position. As a result, the circles of confusion generated by out of focus portions of the scene have brightness characteristics mimicking the characteristics of the light transmission characteristics of the optical system transmission function. This embodiment is simple to implement and can yield images with a variety of bokeh effects. However, scaling the values of image sample points reduces the amount of information represented by an image sample point. As a result, additional image sample points may be needed to provide higher quality images.

As discussed in detail below, another embodiment of the invention shifts the aperture positions assigned to image sample points for the depth of field effect towards regions of higher transmission and away from regions of lower light transmission according to the light transmission characteristics of the optical system transmission function. The renderer then applies the depth of field effect during rendering using these shifted aperture positions. In this embodiment, the light transmission values of the optical system transmission function determine the relative density of aperture positions within the virtual aperture, with a higher density of aperture positions in regions of the aperture with high light transmission values and a lower density of aperture positions in regions of the aperture with low light transmission values. As a result, the circles of confusion generated by out of focus portions of the scene have brightness characteristics mimicking the light transmission characteristics of the optical system transmission function. Because the image sample points associated with shifted aperture positions still sample the scene with their full dynamic range, there is no reduction is the amount of information represented by each image sample point. Thus, there is no need to increase the number of image sample points to maintain image quality.

For example, example light transmission characteristics 400 of the optical system transmission function have high light transmission values at low radius values and low transmission values at high radius values. Thus according to light transmission characteristics 400 of the optical system transmission function, there will be more aperture positions assigned to image sample points in portions of the virtual aperture associated with lower radius values (and higher light transmission values) of the optical system transmission function 400. As a result, the circles of confusion generated by out of focus portions of the scene will be brighter in the middle than at the edges.

Another example 450 of light transmission characteristics of an optical system transmission function have low light transmission values at low radius values and high light transmission values at high radius values. Thus according to the light transmission characteristics 405 of the optical system transmission function, there will be more aperture positions assigned to image sample points in portions of the virtual aperture associated with higher radius values (and higher light transmission values) of the optical system transmission function 405. As a result, the circles of confusion generated by out of focus portions of the scene will be darker in the middle than at the edges.

In further embodiments, aperture positions can be selected using random, pseudo-random, or other stochastic techniques, such as the stratified sampling technique discussed above. In these embodiments, the light transmission characteristics of the optical system transmission function may correspond with a probability distribution of aperture positions over the aperture. The integral of the light transmission characteristics of optical system transmission function over a range of radial distance values [r1, r2] corresponds with the probability of a aperture position within the range [r1, r2] being assigned to any image sample point. Areas of high brightness will have higher probabilities of including aperture positions than areas of low brightness.

FIG. 4B illustrates an example application of an optical system transmission function for shifting aperture positions assigned to image sample points. Aperture 450 includes a set of aperture positions 455A-455I. Aperture positions 455 can be specified in any arbitrary manner, including a pseudo-random and/or stratified arrangement, as described above. Each aperture position 455A-455I is shifted to a new aperture position 460A-460I, respectively, based on the light transmission characteristics of an optical system transmission function, such as the example light transmission characteristics 400.

Embodiments of the invention use the light transmission characteristics of an optical system transmission function to shift aperture positions so that each aperture position has a equal probability of receiving light. In an embodiment, aperture positions are shifted according to the light transmission characteristics of the optical system transmission function by associating the initial aperture positions with a uniform probability distribution. The aperture positions are then shifted so that their distribution matches the probability distribution specified by the optical system transmission function. Thus, aperture positions in portions of the virtual aperture having high light transmission characteristics will be located close together, so that each aperture position represents a sample of light from a scene passing through a relatively small area within the virtual aperture. Conversely, aperture positions in portions of the virtual aperture having low light transmission characteristics will be spaced farther apart, so that each aperture position represents a sample of light from a scene passing through a relatively large area within the virtual aperture.

Alternatively, the stratified aperture regions used to select aperture positions, as discussed above, are associated with a uniform probability function. In this embodiment, each of the stratified aperture regions represents an equal area of the aperture. The boundaries of these aperture regions are remapped according to the light transmission characteristics of the optical system transmission function, so that the integrals of the corresponding portions of the light transmission characteristics of the optical system transmission function associated with the aperture regions are equal, i.e. each remapped aperture region has an equal probability of including an aperture position, according to the provided optical system transmission function. As a result, the remapped aperture regions of the aperture may have different areas, but receive equal amounts of light, as specified according to the light transmission characteristics of the optical system transmission function. Aperture positions may then be randomly or pseudo-randomly selected within the remapped aperture regions, similar to that discussed above with respect to FIGS. 2A-2C.

The example light transmission characteristics of optical system transmission functions 400 and 405 are functions having a single input, the radial position of a aperture position. In further embodiments, optical system transmission functions may be parameterized using one or more inputs. For example, light transmission characteristics of the optical system transmission function may be a function of both radial and angular position. This allows for the specification of bokeh that is radially asymmetric. In another embodiment, the light transmission characteristics of optical system transmission function may be a function of aperture position in other coordinate systems, rather than polar coordinates.

In still a further embodiment, the light transmission characteristics of an optical system transmission function may be a function of not only the aperture position, but of other attributes of the scene or an image. For example, the light transmission characteristics of an optical system transmission function may be a function of the aperture position and a position of a corresponding image sample point. This can be used to vary the distribution of aperture positions according the location of an image sample point. Vignetting is an optical effect in real-world optical systems in which the edges of an image appear darker than the center. By varying the light transmission characteristics of the optical system transmission function according to the position of image sample points or associated pixels, this embodiment of the invention can simulate vignetting in computer generated images. In a further embodiment, different portions of the scene can be associated with different optical system transmission functions, allowing for different aperture shapes and/or light transmission characteristics for different portions of a scene. For example, optical system transmission functions can be assigned on a per-object basis within a scene. During rendering, the renderer identifies each object and assigns aperture positions for each object based on its associated optical system transmission function. This allows different depth of field effects to be applied to different objects, as if each object in the scene was photographed with a different optical system.

Figure 5:
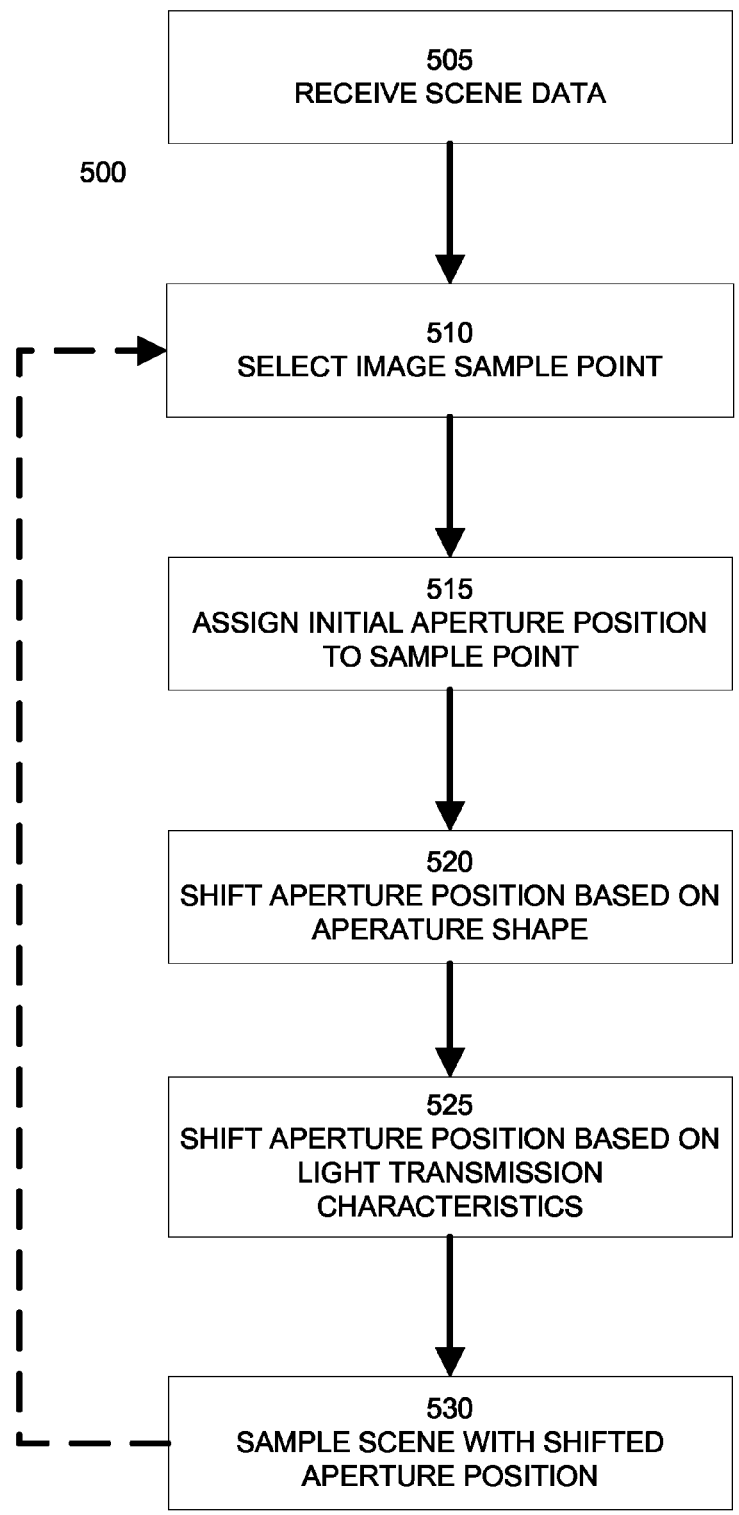
FIG. 5 illustrates a method of creating optical system effects for computer graphics according to an embodiment of the invention.

The above described techniques can be used separately or together to create optical system effects in computer generated images. In general, embodiments of the invention can utilize any arbitrary type of complex optical system transmission function to create optical system effects in computer graphics images. An optical system transmission function may specify the aperture shape, light transmission characteristics, and/or other attributes that potentially affect the appearance of circles of confusion produced by the virtual optical system. A complex optical system transmission function specifies these attributes for a virtual optical system having a non-circular or non-rectangular aperture shape and/or non-constant light transmission characteristics within at least a portion of the virtual aperture. FIG. 5 illustrates a method 500 of creating optical system effects using complex optical system transmission functions for computer graphics according to an embodiment of the invention. Step 505 receives three-dimensional scene data. The scene data can be defined using any three-dimensional modeling and/or animation technique known in the art. Scene data can include programs and data describing the geometry, lighting, shading, motion, and animation of a scene to be rendered.

Step 510 selects an image sample point. In an embodiment, a renderer produces one or more images from scene data by sampling optical attributes of the scene data at a number of different image sample points located on a virtual image plane. Image sample points can correspond with pixels in the rendered image or with sub-pixel samples that are combined by the renderer to form pixels in the rendered image. Image samples such as pixels and sub-pixel samples may be distributed in regular locations on the image plane or at random or pseudo-random locations on the image plane to reduce aliasing and other sampling artifacts.

Step 515 assigns an initial aperture position to the selected image sample point. In an embodiment, a virtual aperture is centered around the selected image sample point and located in a virtual aperture plane. The image sample point is aligned with an optical axis passing through the center of the virtual aperture and perpendicular to the image plane. The virtual aperture plane is typically positioned (within the virtual space defining the scene) at a focal distance from the virtual image plane.

An embodiment of step 515 selects an arbitrary point within the aperture on the virtual aperture plane as an aperture position for the selected image sample point. In a further embodiment, step 515 selects aperture positions randomly or pseudo-randomly within the virtual aperture, so that the distribution of aperture positions assigned to the set of image sample points covers the entire aperture without any undesirable visually discernable patterns. In a further embodiment, step 515 selects an aperture position for the selected image sample point using the stratified aperture regions as shown in FIGS. 2A and 2B.

Step 520 shifts the initial aperture position assigned to the selected image sample point based on the shape of the aperture as defined by the complex optical system transmission function. In an embodiment, step 520 shifts the initial aperture position according to the transformation shown in FIGS. 3A and 3B from a location within a square or other aperture shape to a corresponding location in a polygonal or bowed-edged polygonal aperture.

Following step 520, step 525 further shifts this aperture position based on the light transmission characteristics of the virtual aperture, as specified by the complex optical system transmission function, as illustrated by FIGS. 4A and 4B. As discussed above, the aperture position is further shifted such that distribution of aperture positions associated with a representative sample of image sample points matches the probability distribution of aperture positions specified by the light transmission characteristics of the complex optical system transmission function.

In an alternative embodiment, step 525 associates a scaling value with the image sample point based on the light transmission characteristics of the complex optical system transmission function. In this embodiment, the scaling value will be used to scale the color value of the image sample point.

In a further alternative embodiment, steps 515, 520, and 525 can be combined and an aperture position can be selected directly using the aperture shape and the light transmission characteristics of a complex optical system transmission function, rather than selecting an initial aperture position and moving or shifting this aperture position according to the aperture shape and light transmission characteristics of the complex optical system transmission function.

Step 530 samples the scene data with the shifted aperture position to determine one or more attribute values for the selected image sample point. Embodiments of step 530 can apply any rendering technique known in the art to determine the value of the image sample point, including applying texture, environment, lighting and shadow maps and executing lighting and shading programs. In an embodiment, the optical attributes of geometric primitives in the scene data are determined and stored prior to performing method 500. Step 530 can retrieve and combine the stored optical attribute values of geometric primitives associated with an image sample point to determine one or more attribute values of the selected image sample. Step 530 may apply a filter kernel or other weighting scheme to determine its attribute values from the combination of attribute values of two or more geometric primitives. Step 230 may also store depth information for each image sample to use with Z-buffering or any other depth compositing technique known in the art.

For example, an embodiment of step 530 may use ray tracing or any other light transport rendering technique to determine the optical attributes of the portions of the scene data intersecting a ray passing through the image sample point and its shifted aperture position.

In another embodiment, step 530 projects geometric primitives in the scene data on to the image plane to identify one or more geometric primitives intersecting the selected image sample point. In this embodiment, because image sample points are often associated with different aperture positions, each image sample point views the scene data from a slightly different point of view. As a result, a different projection transformation may be required to project geometric primitives on the image plane for each image sample point.

As an alternative to using a different projection transformation for each image sample point, a further embodiment utilizes the following depth of field rendering technique.

Figure 6:
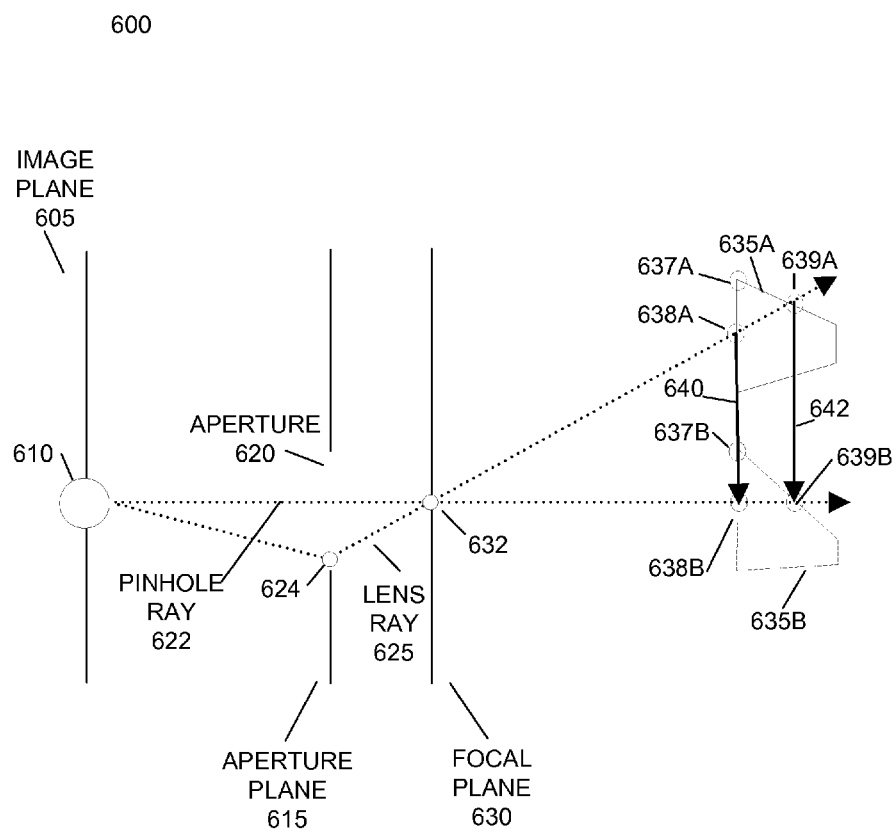
FIG. 6 illustrates an example depth of field rendering technique suitable for use with an embodiment of the invention.

FIG. 6 illustrates an example application 600 of an embodiment of the invention. Example 600 includes an image plane 605. Image plane 605 includes an image sample point 610. Example 600 also includes an aperture plane 615 with a virtual aperture 620.

If aperture 620 were a pinhole aperture, as assumed by prior renderers that could not simulate depth of field, then following a perspective transformation, the image sample 610 would view the scene along pinhole ray 622. However, because aperture 620 is larger than a pinhole aperture and the image sample 610 is associated with a aperture position 624, image sample 610 views the scene along lens ray 625. Lens ray 625 originates at image sample point 610, passes through aperture position 624 in the aperture plane 615 and focal point 632 in focal plane 630.

An embodiment of the invention shears the scene geometry towards the center of the aperture 620 by the distance between the pinhole ray 622 and the lens ray 625 at the depth of the geometry. For example, an unsheared object 635A includes points at positions 637A, 638A, and 639A. Each of these points will be sheared or displaced parallel to the image plane by the distance between the lens ray 625 and the pinhole ray 622 at the depth of each point. For example, at the depth of points 637A and 638A, the distance between the lens ray 625 and the pinhole ray 622 is vector 640. Thus, points 637A and 638A will be sheared by vector 640 to form sheared points 637B and 638B. Similarly, the distance between the lens ray 625 and the pinhole ray 622 at the depth of point 639A is given by vector 642. Thus, all points at this depth will be sheared by vector 642. For example, point 639A is sheared by vector 642 to form point 639B. After shearing or displacing all of the points of object 635A by an amount based on the distance between the lens ray 625 and the pinhole ray 622 at their respective depths, the sheared points form a sheared version 635B of object 635A.

In example 600, the point originally at location 638A and intersected by lens ray 625 is sheared to location 638B, where it is intersected by the pinhole ray 622. Thus, the view of the unsheared scene from image sample 610 along the lens ray 625 is the same as the view of the sheared scene along pinhole ray 622. Because these views are identical, the renderer can sample the sheared version of the scene along pinhole ray 622 to determine the image sample's 610 view of the unsheared scene along lens ray 625.

Similarly, the renderer can evaluate all of the image samples along parallel pinhole rays, while shearing the scene differently for the image samples to account for each image sample's assigned aperture position. Because all of the image samples sample the image along parallel rays, the renderer can apply the same projection transformation to the scene data for all of the image sample points and use conventional Z-buffering and depth compositing techniques to determine the attribute values of image sample points.

It should be noted that lens ray 625 and pinhole ray 622 are intended for illustration and that the scene can be rendered using this depth of field shearing technique with any rendering technique known in the art, including non-raytracing rendering techniques such as polygon or micropolygon rasterization and scanline rendering techniques. For example, an embodiment may project geometry into an image plane while storing the depth values of the geometry. For each image sample, geometry is sheared or displaced based on its depth and the aperture position assigned to the image sample. Any sheared geometry intersecting the image sample point is composited in according to its depth to determine the attribute values of the image sample. This process is repeated for each image sample point.

Figure 7:
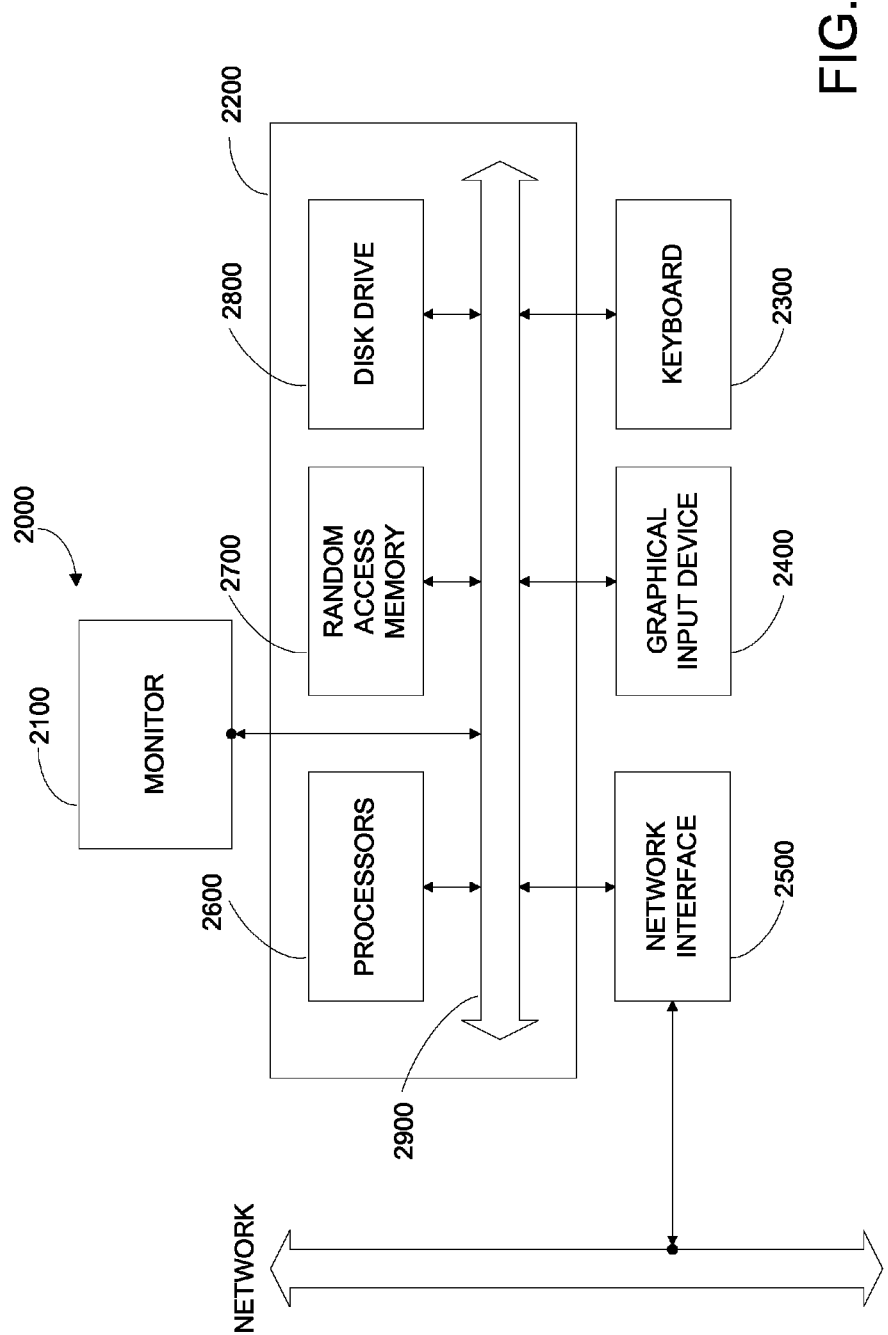
FIG. 7 illustrates a computer system suitable for implementing an embodiment of the invention.

FIG. 7 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices. A film recorder device can record images on photographic film for use with film projectors.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of creating an optical system effect in a computer graphics image, the method comprising:
    receiving scene data defining a three-dimensional scene;
    receiving optical system data including a complex optical system transmission function;
    selecting an image sample point for sampling the scene data;
    selecting an aperture point, wherein the aperture point has an attribute based on the complex optical system transmission function; and
    providing the scene data, the image sample point, and the aperture point to a renderer, wherein the renderer is adapted to determine an image sample point value for the image sample point from the scene data and the aperture point;
    wherein the attribute of the aperture point is a scaling factor adapted to scale the image sample point value of the image sample point according to a light transmission characteristic value of the complex optical system transmission function.

2. The method of claim 1, wherein the attribute of the aperture point is a location within a lens aperture consistent with a probability density function defined by light transmission characteristics of the complex optical system transmission function, wherein the probability density function specifies a probability of receiving light at the location within the lens aperture.

3. The method of claim 2, wherein the probability of receiving light within a first area associated with the location is equal to the probabilities of receiving light within additional areas within the lens aperture, wherein the additional areas are associated with additional aperture points and additional image sample points.

4. The method of claim 1, wherein the optical system data includes a non-circular and non-rectangular lens aperture shape, and wherein the aperture point includes a location attribute defined at least in part by the lens aperture shape.

5. The method of claim 1, wherein the optical system data includes non-constant light transmission characteristics within at least a portion of a lens aperture, and wherein the aperture point includes a location attribute defined at least in part by the light transmission characteristics.

6. The method of claim 1, wherein selecting the aperture point comprises:
  selecting an initial location within a lens aperture for the aperture point; and
  modifying the initial location to a new location based on light transmission characteristics of the complex optical system transmission function.

7. The method of claim 1, wherein selecting the aperture point comprises:
  selecting an initial location within a lens aperture for the aperture point; and
  modifying the initial location to a new location based on a lens aperture shape included in the optical system data.

8. A method of creating an optical system effect in a computer graphics image, the method comprising:
  receiving scene data defining a three-dimensional scene;
  receiving optical system data including a complex optical system transmission function;
  selecting an image sample point for sampling the scene data;
  selecting an aperture point, wherein the aperture point has an attribute based on the complex optical system transmission function; and
  providing the scene data, the image sample point, and the aperture point to a renderer, wherein the renderer is adapted to determine an image sample point value for the image sample point from the scene data and the aperture point;
  wherein the attribute of the aperture point is a location within a lens aperture consistent with a probability density function defined by light transmission characteristics of the complex optical system transmission function, wherein the probability density function specifies a probability of receiving light at the location within the lens aperture;
  wherein the probability of receiving light within a first area associated with the location is equal to the probabilities of receiving light within additional areas within the lens aperture, wherein the additional areas are associated with additional aperture points and additional image sample points;
  wherein the location of the aperture point within the first one of the plurality of aperture regions is randomly determined.

9. A method of creating an optical system effect in a computer graphics image, the method comprising:
  receiving scene data defining a three-dimensional scene;
  receiving optical system data including a complex optical system transmission function;
  selecting an image sample point for sampling the scene data;
  selecting an aperture point, wherein the aperture point has an attribute based on the complex optical system transmission function; and
  providing the scene data, the image sample point, and the aperture point to a renderer, wherein the renderer is adapted to determine an image sample point value for the image sample point from the scene data and the aperture point;
  wherein the attribute of the aperture point is a location within a lens aperture consistent with a probability density function defined by light transmission characteristics of the complex optical system transmission function, wherein the probability density function specifies a probability of receiving light at the location within the lens aperture;
  wherein the probability of receiving light within a first area associated with the location is equal to the probabilities of receiving light within additional areas within the lens aperture, wherein the additional areas are associated with additional aperture points and additional image sample points;
  wherein the location of the aperture point within the first one of the plurality of aperture regions is pseudo-randomly determined.

10. A method of creating a optical system effect in a computer graphics image, the method comprising:
  receiving scene data defining a three-dimensional scene;
  receiving optical system data defining a lens aperture including a complex optical system transmission function;
  selecting image sample points for sampling the scene data;
  for each image sample point, selecting an aperture point, wherein each of the aperture points has a location within the lens aperture, wherein a distribution of locations of the aperture points is based on the complex optical system transmission function; and
  providing the scene data, the image sample points, and the aperture points to a renderer, wherein the renderer is adapted to determine image sample point values for the image sample points from the scene data and the aperture points;
  wherein the distribution of the locations of the aperture points is consistent with a probability density function specifying probabilities of receiving light at the locations of the aperture points, wherein the probability density function is defined by light transmission characteristics of the complex optical system transmission function;
  wherein the each aperture point is associated with a portion of the probability density function, wherein the portions of the probability density function have equal probabilities;
  wherein the portions of the probability density function corresponds with aperture regions of the lens aperture, wherein the location of each aperture point is within one of the aperture regions;
  wherein the locations of the aperture points within the aperture regions are pseudo-randomly selected.

11. The method of claim 10, wherein the locations of the aperture points have equal probabilities of receiving light according to the probability density function.

12. The method of claim 10, wherein at least a portion of the aperture regions have different areas in the lens aperture.

13. The method of claim 10, wherein the image sample points are included within a pixel.

14. The method of claim 13, wherein the complex optical system transmission function varies according to a location of the pixel.

15. The method of claim 10, wherein the optical system data further defines an aperture shape of the lens aperture and wherein the locations of the aperture points are based at least in part on the aperture shape.

16. The method of claim 15, wherein the aperture shape is a regular polygon.

17. A method of creating a optical system effect in a computer graphics image, the method comprising:
  receiving scene data defining a three-dimensional scene;
  receiving optical system data defining a lens aperture including a complex optical system transmission function;
  selecting image sample points for sampling the scene data;

for each image sample point, selecting an aperture point, wherein each of the aperture points has a location within the lens aperture, wherein a distribution of locations of the aperture points is based on the complex optical system transmission function; and providing the scene data, the image sample points, and the aperture points to a renderer, wherein the renderer is adapted to determine image sample point values for the image sample points from the scene data and the aperture points;

wherein the distribution of the locations of the aperture points is consistent with a probability density function specifying probabilities of receiving light at the locations of the aperture points, wherein the probability density function is defined by light transmission characteristics of the complex optical system transmission function;

wherein the each aperture point is associated with a portion of the probability density function, wherein the portions of the probability density function have equal probabilities;

wherein the portions of the probability density function corresponds with aperture regions of the lens aperture, wherein the location of each aperture point is within one of the aperture regions;

wherein the locations of the aperture points within the aperture regions are randomly selected.

* * * * *